United States Patent Office 3,503,836
Patented Mar. 31, 1970

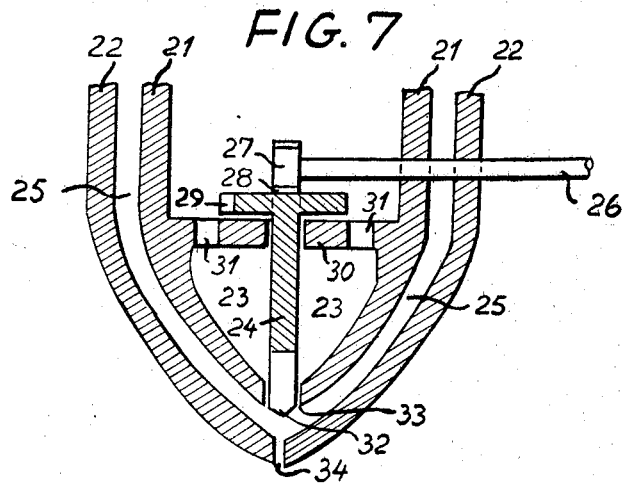
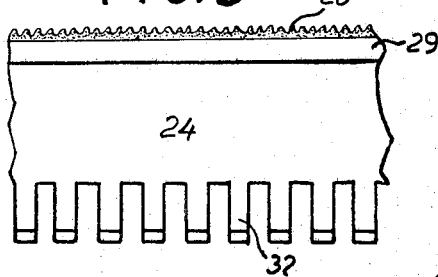
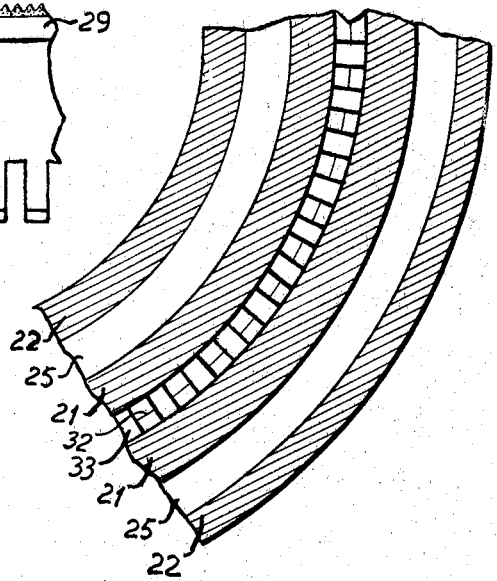
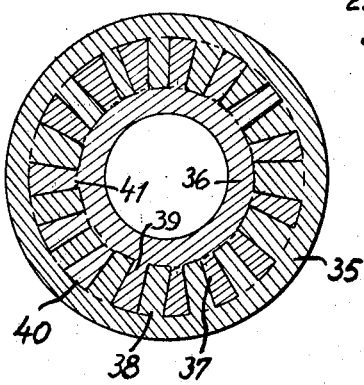

3,503,836
SPLIT FIBROUS SHEET AND METHOD FOR MAKING THE SAME
Ole-Bendt Rasmussen, 14 Gyvelbakken, Birkerod, Denmark
Filed Aug. 7, 1964, Ser. No. 388,213
Claims priority, application Great Britain, Aug. 10, 1963, 31,676/63
Int. Cl. D04h 13/00; B32b 3/10, 5/12
U.S. Cl. 161—109
5 Claims

ABSTRACT OF THE DISCLOSURE

A sheet-like array of integrally interconnected split fibers of a synthetic polymer are additionally interconnected by integrally formed embedded fibrils of a second and chemically different polymer stretching between the split fibers at an angle to their length. This product is obtained by modifying a known process in which an extruded sheet of split-fiber forming synthetic polymer is stretched in two directions, one of which is inclined with respect to the first, to expand the sheet into an open array of interconnected split fibers by introducing into the extruded sheet during its extrusion elongated fibrils of a second polymer which is resistant to split-fiber formation with the fibrils extending at an angle to the first stretching direction.

---

The present invention relates to an improved fibrous article, mainly for textile use, of the kind which can be produced by splitting up oriented thermoplastic films, and to a method of manufacturing the said improved fibrous article.

It is well-known that the splitting-up can be stopped at a stage where the fibres are still interconnected, forming a branched network structure of very fine meshes. A suggestion has been made for producing nonwoven fabrics by cross-lamination of layers consisting of these partially split-up films. Because of the fact that the fibres are still mutually connected to form a branched structure, there is less need of adhesive connections than in the manufacture of the usual nonwoven fabrics, and the fabric can, therefore, be made more flexible than the usual adhesively joined fabrics without decrease in abrasion resistance. However, as the polymer material has a high tendency for continued splitting-up, the coherence in the branched structure is not very good, and either the abrasion resistance or the flexibility of the nonwoven fabrics will still be insufficient for many textile purposes.

The network of branched fibres produced from an oriented film may also be cut into continuous strips and used as a yarn, normally after twisting. In order to obtain high bulk of such yarn, it has been suggested that the branched structure is to be spread to an open-meshed state, and subjected to a treatment of fixation. A heat treatment, a swelling, an irradiation or chemical treatments of the polymer have been suggested for this fixation, and coating of the fibres has also been used. The intended effect is to maintain the fibres spaced apart. However, it was found that also the bulky yarn thus produced still shows a relatively low abrasion resistance, because of a strong tendency for continued splitting, and it further proved that the above-mentioned treatments, which prevent the branched fibrework from collapsing to a nonbulky state, make no effective fixation in the sense of eliminating the tendency for continued splitting-up.

Finally, a special branched fibrous structure has been produced having two orders of fibres, i.e., relatively coarse and long fibres, called stem-fibres, and relatively fine and short fibres, called branch-fibres, the latter interconnecting the former. Both types of fibres consist of the same polymer substance and are made from the same film. This structure is formed when the oriented film is subjected to shear (distortion) along the direction of orientation at the same time as a stretching perpendicularly to this direction takes place.

In this connection it is known that the tendency for further splitting can be somewhat reduced, if the stretching of the fibrework is finished at an elevated temperature, resulting in some enlargement of the material and a change of direction of orientation taking place at the bottom of the splits, and that the resulting structure may be worked up, if so desired, to staple fibres, each consisting of a stem-fibre with projecting branch-fibres. It has been found necessary, however, to further reduce or eliminate the tendency for continued splitting in the finished product.

The object of the present invention, therefore, is to provide a fibrous product consisting of individual or interconnected fibres made from a basic polymer in the form of an oriented thermoplastic, synthetic polymer material of high molecular weight with elements which are suited for holding the fibres apart and which are further, when used on branched fibrework, suited for holding them in such fixed position that a strong resistance is set up against propagation of splitting during use of the article.

The fibrous products according to the present invention notably are textile fibres supplied with fibrils which consist of a synthetic polymer substance differing in properties from the polymer from which the fibres are made, said fibrils being incorporated in, traversing through or extending from the fibres, in such manner that each of the incorporated fibrils is at least partially embedded in one to several fibres of the said fibrous product.

The term "fibrils" as used here is intended to broadly cover any small body of the incorporated polymer, of which one dimension is much larger than any of the others, and is not limited to fibrelike bodies, nor to bodies of regular cross section.

A method of producing the fibrous article of the present invention generally comprises incorporation in the basic polymer of a polymer of different properties in the form of fibrils, producing a film from the resulting polymer blend, subsequently strongly orienting the basic polymer by stretching said film, and finally splitting the oriented film into individual or interconnected fibres in known manner.

The said method results in a fibrous product, which is useful both in the manufacture of staple fibres from oriented films, in the production of a yarn from a branched fibre structure, and in the making of nonwoven textiles.

The incorporation of the fibrils has the effect of steadily keeping the fibres apart, and the product thus becomes very bulky. When the splitting process is carried out in such a way that the fibres form a branched structure, in which the fibrils stretch across the splits from fibre to fibre, the fibrils will keep the bulk by holding the network of interconnected fibres open-meshed and prevent collapsing of the structure, but they will also resist further drawing out and splitting by, so to say, locking the split structure.

Two different, but related effects are hereby achieved by substantially the same means, but it should be understood that a choice has to be made between the various embodiments of the present invention as regards special wishes either for good locking of the structure or high bulk.

Thus, if good locking is wanted, the longitudinal direction of the incorporated fibrils should preferably form a relatively small angle with the direction of orientation of the basic polymer. The fibrils will then firmly interconnect the fibres.

If, on the other hand, high bulk is wanted, the fibrils should preferably consist of a polymer substance which is easily stretched and, if desired, also expanded at least in the parts interconnecting the fibres. The expansion, by means of an incorporated expansion agent, should normally be carried out either between the orientation step and the splitting step, or after splitting has taken place, and the angle between the fibrils and the direction of orientation of the basic polymer should preferably be made relatively large and even be up to 90°.

The force used for splitting the basic polymer also effects stretching of the incorporated fibrils, and further bulk can be obtained by the said incorporation of an expansion agent, squeezing part of the fibril material out of the fibres.

During the orienting of the basic polymer, the fibrils will normally wholly or partly lose connection with the adjoining surfaces of the basic polymer, and large channels will be formed along the fibrils. This facilitates expansion of the fibrils and allows for even part of a fibril lying within the body of a fibre to expand substantially.

In a preferred embodiment of the present method, a mixture of the basic polymer and the polymer, which is to form the fibrils, is extruded to form a tubular film, whereby the particles of the latter polymer will be drawn out longitudinally in fibrillar form, and the tube is then cut spirally in known manner to form a continuous plan film, in which the fibrils lie at an angle to the longitudinal direction, after which the film is oriented by lengthwise stretching, and the oriented film is split into fibres.

The incorporated fibrils should preferably be of an average diameter substantially below the thickness of the films.

By using a suitably hydrophilic polymer for forming the fibrils, desired properties in respect, for example, of dyeability, moisture transport and antistatic effect can be obtained.

If the two polymers to be mixed are of very different chemical character, it may be advisable to use a graft or block polymer as a mixing aid. The conditions during mixing can be adjusted so as to obtain the preferred average diameter, which is normally between about $1\mu$ and 25% of the film thickness.

In order to obtain the preferred high degree of dispersion in the basic polymer of the foreign polymer used for the fibrils, the latter should preferably be of relatively low molecular weight. The dispersion process is facilitated when, at the start, this polymer is intensively mixed with a relatively low molecular weight modification of the basic polymer, or with a polymer which is well compatible with the latter polymer. This mixture is subsequently used as a master batch and mixed with the rest or all of the basic polymer.

During the splitting of the oriented basic polymer, when the film is drawn in a direction lateral to the direction of orientation, or distorted in the said direction, the graft fibrils should preferably become drawn or squeezed out from the basic polymer and thus be stretched to several times the original length across the splits. To this end, the polymer used for the fibrils should preferably be of a very high stretchability at a temperature where the oriented basic polymer is still capable of splitting readily, but on the other hand, the material ought to be non-tacky at room temperature at the end of the procedure. In many cases, thermoelastic materials with relatively low softening points, e.g., polyvinyl acetate or polystyrene, are suitable as the fibril-forming polymer to be incorporated in oriented high density polyethylene or isotactic polypropylene as the basic polymer, the splitting being carried out at a temperature between about 50–80° C.

However, it is generally preferable to use, for the fibrils, a polymer which can be cured to increase its mechanical stability, and to carry out such curing after the splitting process, when the fibrils are drawn out to their final form. The curing can consist, for example, of a condensation, or a polymerisation, or a cross-linking, and it can be carried out by means of chemical agents or by irradiation. By use of such a technique, the molecular weight of the incorporated polymer can be selected at an especially low value by which the stretchability is extremely high. As an example, the well-known isocyanate polycondensation products such as the so-called polyesters or polyethers, normally used for manufacture of foamed articles, are well suited for production of the fibrils, preferably in precondensated form, and the normal curing agents can be used. The final curing is carried out after the splitting, e.g., by means of a cross-linking agent, such as an amine, if the precondensate contains a surplus of isocyanate groups, or an isocyanate in the opposite case.

Other relatively low-molecular weight polymers, which similarly may be cured, are also suitable.

In connection with incorporation of the fibrils, the following method can also be used. A relatively low molecular weight substance of the kind which can be cured as described above, such as the above isocyanate polycondensation products, is incorporated as a very fine dispersion in the basic polymer, and subsequently a film is made from the mixture and stretched so as to make it ready for splitting in the same direction as the length direction of the incorporated fibrils. Real molecular orientation is not necessary for the splitting when the amount of the said incorporated fibrillar substance is relatively high. Then the film is split up, and it is observed that fibre-drawing of the incorporated substance takes place during the splitting. Finally, the fibres formed by the incorporated polymer are cured. Although it is, in fact, better in some respects to have an angle between the length direction of the incorporated fibrils and the direction of splitting, especially because the fibrils do hereby become better connected with the basic polymer, a surprising result is obtained, as very fine fibres are formed in any case, regardless of the said directions, when a finely dispersed relatively low-molecular weight polymer, capable of being cured to form a mechanically resistant polymer, is subjected to fibre-drawing by means of a splitting of the film, in which it is incorporated, and when the said polymer is finally cured.

When the general principle of incorporating foreign fibrillar polymer segments disposed angularly to the direction of orientation is used for producing elements suited for stopping propagation of the splits, the preferable conditions are very different from those described above. The incorporated fibrils or fibrillar elements should then preferably be relatively coarse, consisting of a substance which is tougher than the basic polymer, but having the ability to unite well with the latter. Generally, there is no substantial need for stretching of the said fibrils during or after the splitting, although such stretching may be of advantage. In order to acquire sufficient toughness, the said fibrils can be produced from a substance generally of the same composition as the basic polymer, but having a substantially higher crack resistance, as obtained for instance by copolymerization, or by blending with a compatible elastomer, or by other well-known methods. The basic polymer can, on the other hand, advantageously contain a substance which decreases the crack resistance, such as slipping agent or a low-molecular weight modification of the basic polymer.

The orientation and splitting of the basic polymer may be performed in a single step, particularly if relatively large grains of the slipping agent are used, and if stretching is carried out at a relatively low temperature.

The invention will be more particularly described in the following with reference to the accompanying drawings wherein:

FIGURE 7 is a longitudinal cross section through part of a circular extruder head.

FIGURE 8 is an elevation of a part of a serrated blade mounted in the extruder head.

FIGURE 9 is a sectional view perpendicular to that of FIG. 7.

FIGURE 10 is a cross section of a simplified embodiment of a circular extruder head.

Figure 1:
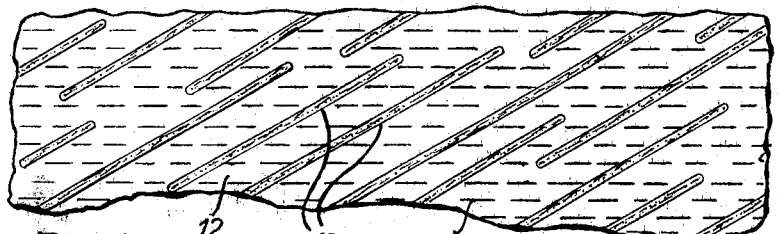
FIGURE 1 shows the structure of a film with incorporated fibrils, before splitting.

In FIG. 1, broken lines 11 represent the direction of orientation of the basic polymer of a film 12 with incorporated fibrils 13.

Figure 2:
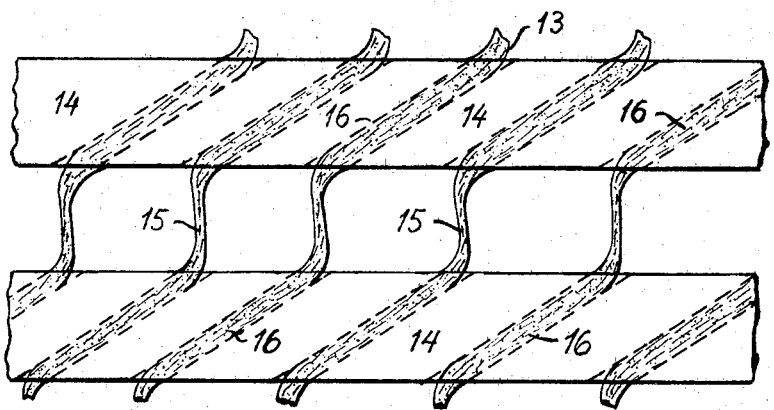
FIGURES 2 and 3 show two kinds of fibrous structures according to the invention.

The structure in FIG. 2 is formed by subjecting the film of FIG. 1 to a splitting process by forces acting perpendicularly to the direction of orientation. This results in longitudinal fibres 14 interconnected by stretched portions 15 of the fibrils 13 with other portions 16 of the latter lying embedded in the fibres 14.

Figure 3:
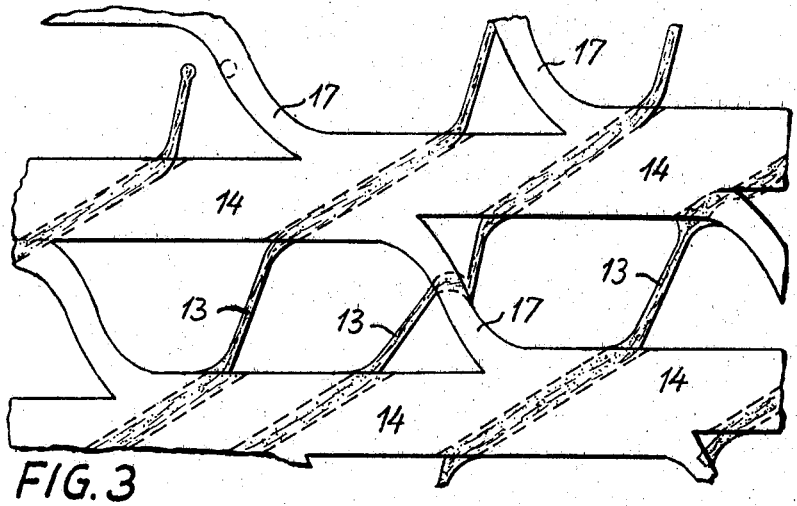

FIGURE 3 illustrates the result of a splitting by shear action. The main fibres 14 are interconnected by thinner fibres 17 of flat S-form, branching off from two neighbouring fibres 14, the fibrils 13 in partly stretched form transversing the main fibres 14 as well as some of the branch fibres 17 to counteract further splitting.

It is advisable to use a fibril-forming polymer which is either an elastomer, or a polymer of lower melting point than the basic polymer. This can be obtained either by suitably selecting the polymers, or by plasticizing the fibril-forming polymer.

Figure 4:
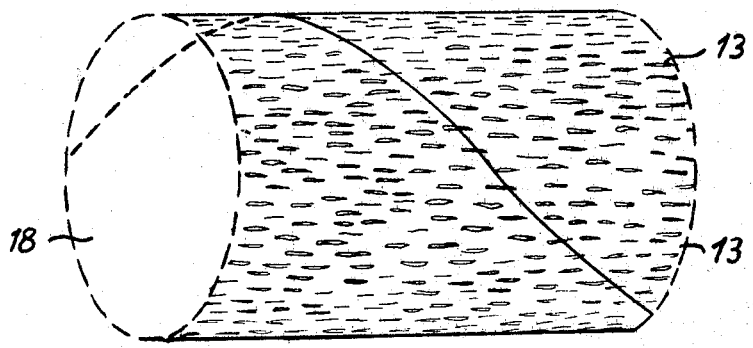
FIGURE 4 shows part of a tubular film with lengthwise incorporated fibrils before helical cutting to give the structure shown in FIG. 1.

FIGURE 4 shows a tubular film 18 with longitudinal fibrils 13 incorporated therein. A film of this kind can be made, for example, by mixing grains of a basic polymer with grains of a fibril-forming polymer, and extruding the mixture, using a cylindrical extruder head, the fibrils being formed during the extrusion. On cutting the tube along a helical line 19, a plan film is obtained, which on stretching gives an oriented film as that shown in FIG. 1.

Figure 5:
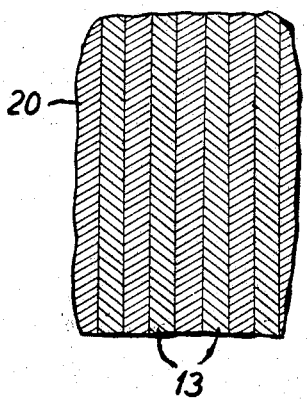
FIGURE 5 shows another structure of a film before splitting.
Figure 6:
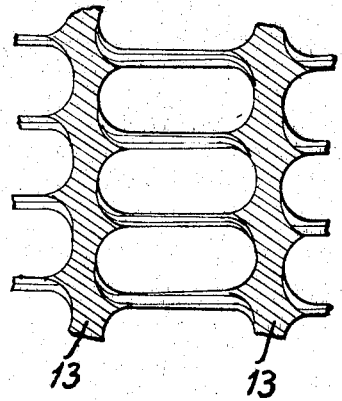
FIGURE 6 shows the film of FIG. 5, after splitting.

The film structure of FIG. 5 comprises fibrils 13 incorporated in a basic polymer, which has been oriented, the direction of orientation being indicated by the lines 20. The fibrils are relatively coarse, consisting of a polymer, which is tougher than the basic polymer, but of good adherence to the latter. In FIG. 6 is shown the result of splitting this film, and it appears from the figure, that in this case the fibrils actually are of larger cross-section than that of the fibres.

The extruding device illustrated by FIGS. 7 to 9 consists of two slit dies 21 and 22, the former lying within the latter. The two dies are to be fed from separate extruders. The polymer substance for making the fibrils is led to the inner die 21 at 23, and is worked up, while still fluid, into coarse filaments by means of a cam device 24.

The cam device 24 is rotated by a shaft 26, carrying a cog-wheel 27 engaging a rack 28 on top of the cam device. Supports 29 on either side of the cam device rest on shoulders 30 within the die 21, said shoulders being perforated as at 31 for passage of the polymer. The cam device has teeth 32 at the bottom edge, being positioned in the extrusion slit 33 of the inner die 21. The basic polymer is fed into the space 25 outside the inner die 21. At the moment, the said filaments leave the inner die, they will thus be surrounded by the basic polymer.

By rotating the cam device 24 quickly, or by giving it a reciprocatory movement at a velocity far above the linear speed of the basic polymer, the filaments leaving the cam device 24 are highly stretched and become fine fibrils lying close together in a substantially lateral direction to the direction of extrusion through the slit 34 of the outer die 22.

The simplified extruder head of FIG. 10 has an outer cylindrical space 35, to which the basic polymer is fed from one extruder, and an inner cylindrical space 36, to which the fibril-forming polymer is supplied from another extruder.

Between the said outer and inner spaces, radially disposed partitions 37 are provided, alternate spaces between which communicate with the outer cylindrical space 35 as shown at 38, the intervening spaces communicating with the inner cylindrical space 36 as shown at 39, cylinder parts 40 and 41 closing to the opposite sides. The structure formed by the partitions 37 and the parts 40 and 41 extends into the cylindrical extrusion slit. It will be realised that using this device, a tubular film can be extruded with longitudinal fibrils or filaments embedded in the basic polymer, the coarseness of the fibrils depending on the proportions between the fibril-forming polymer and the basic polymer.

The invention is further illustrated by the following examples.

EXAMPLE 1

As the basic polymer is used a polyethylene, having a density of 0.96, and a melt index, according to ASTM D1238/57T under condition E, of 0.2.

As the fibril-forming polymer is used a precondensate form polypropylene glycol (molecular weight 1200) and toluene diisocyanate in a molecular proportion of 1:2, i.e., twice the equivalent amount of isocyanate. The precondensation is performed during 24 hours at 25° C., and the precondensate is of a syrupy consistency.

15 parts by weight of the fibril-forming polymer and 85 parts by weight of the basic polymer are kneaded together at 190° C. until the average particle size is 6$\mu$, the viscosity of the fibril-forming polymer increasing by about 5 times during this kneading and a subsequent extrusion to a tubular film of 70$\mu$ thickness.

The tubular film is cut helically at an angle of 45°, and the resulting film band is longitudinally stretched at 120° C. in the ratio of 10:1.

The stretching imparts orientation to the basic polymer material in the film, and the latter is then split into fibres by being rubbed between rubber surfaces, which are pressed against one another with the film in between. By the fiberizing treatment, parts of the fibrils incorporated in the basic polymer are stretched to form connections between the fibres.

The fibrils are then hardened by means of a solution of one part by weight of 4,4'-methylene-bis-(2-chloroaniline) in 4.5 parts by weight of polypropylene glycol (mole weight 1200). By hardening for 5 minutes at 50° C., the polyurethane becomes rubber-like and unmeltable.

A yarn made from the resulting product is very bulky, owing to the fibrils, and dyeable by means of direct cotton dyes.

EXAMPLE 2

A basic polymer is used, consisting of a mixture of 70% by weight of polypropylene of density: 0.907, and a melt index (ASTM D1238/57T—condition I) of 0.7, and 30% by weight of polyethylene of 0.92 density, and a melt index of 20 (determined as in Example 1).

The mixture is kneaded carefully, and then allowed to solidify, whereby the polyethylene separates as microscopic particles.

The fibril-forming polymer consists of equal parts by weight of a polypropylene as specified above, and a polyisobutylene of melt index: 1, determined in the same manner as for the polypropylene, the mixture being subjected to careful kneading.

The two polymer blends are extruded from a separate extruder for each of them, and passed through an extruder head as the one shown in FIG. 10, where the area between two of the radial partitions is 1 mm. by 1 mm., the width of the extrusion slit, however, being only 0.5 mm.

By the extrusion, a tubular film of 70μ thickness is formed without lateral stretching, and cut helically at an angle of 45°, the resulting band being stretched at 120° C. in the ratio of 6:1.

By splitting in the manner described in Example 1, but at a temperature of about 110° C., a "locked" fibrous product is obtained, in which the tendency for further splitting is eliminated.

EXAMPLE 3

The fibril-forming polymer is polycaprolactam, and the basic polymer is the same polycaprolactam mixed with a copolymerisate of caprolactam and adipic acid plus hexamethylene diamine in the ratio 1:1. The melting indexes are 3 and 6, respectively (ASTM as above, condition K).

The components of the basic polymer are mixed by careful kneading, and the blend is made splittable by swelling, with, for example ethanol, which does not swell the pure polycaprolactam used for the fibril-forming polymer.

The components are extruded and the resulting tubular film cut helically as in Example 2, and stretched at 140° C. in the ratio 1:5.

The stretched film is swelled by immersion for 1 minute in ethanol, and split at 120° C., whereby the ethanol is dried away, and a locked fibrous structure is obtained.

I claim:

1. A fibrous extruded sheet product essentially composed of an integrally interconnected array of split fibers of a synthetic fiber-forming polymeric material having a main longitudinal axis, said split fibers being additionally interconnected by stretched fibrils of a second synthetic polymeric material chemically different from said first material formed integrally with said split fibers and embedded therein, each such fibril extending between at least two different proximate split fibers at an angle to the length of the split fibers.

2. A fibrous sheet product as in claim 1, characterized in that the first polymer is high density polyethylene or polypropylene and said second polymer is polyvinyl acetate, polystyrene or polyurethane.

3. In a method of producing a fibrous sheet by the steps of extruding a sheet of a split-fiber forming synthetic polymeric material, stretching said sheet in a first direction to produce therein substantially parallel lines of cleavage in said first direction, then stretching said sheet in a second direction inclined with respect to said first direction to rupture said sheet along said lines of cleavage and thereby expand the sheet into an open array of interconnected split fibers, the improvement of introducing bodily into the extruded sheet substantially uniformly therethrough elongated fibrils of a second polymeric material relatively resistant to split fiber formation compared to said first material, and selecting said first stretching direction at an angle to the length of said fibrils, whereby said fibrils extend angularly between the split fibers in said expanded sheet.

4. The method of claim 3, wherein said second polymeric material is curable into a cross-linked condition and said article is finally subjected to a treatment to cure said polymer.

5. A method as in claim 3, wherein said sheet is formed as a tube which is cut along a helical line and opened out into a plane, the longitudinal direction of the elongated fibrils extending at an angle to the longitudinal direction of the sheets, and said sheet is stretched in its longitudinal direction before being ruptured.

References Cited

UNITED STATES PATENTS

| | | | |
|---|---|---|---|
| 3,003,304 | 10/1961 | Rasmussen | 156—148 XR |
| 3,186,893 | 6/1965 | Mercer | 161—112 XR |
| 2,853,741 | 9/1958 | Costa et al. | 161—402 |
| 2,943,356 | 7/1960 | Rasmussen. | |
| 3,117,055 | 1/1964 | Guandique et al. | 161—170 |
| 3,259,539 | 7/1966 | Katz et al. | 162—146 |

ROBERT F. BURNETT, Primary Examiner

W. A. POWELL, Assistant Examiner

U.S. Cl. X.R.

57—157; 156—244, 250; 161—169, 402; 264—160, 291